Figure 1:
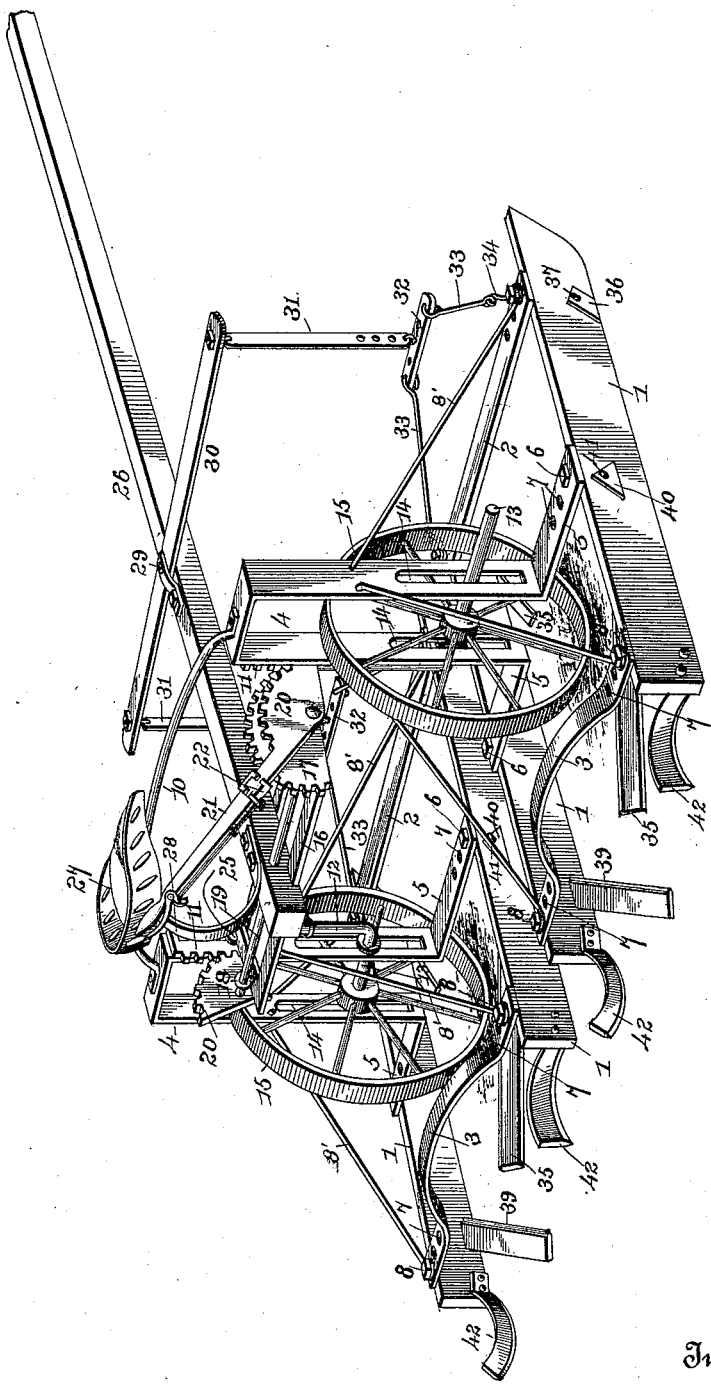

(No Model.)

2 Sheets—Sheet 1.

W. F. COCHRAN.
CULTIVATOR.

No. 507,309. Patented Oct. 24, 1893.

Witnesses:
Jas. K. McCuthron
W. S. Duval

Inventor:
William F. Cochran
by Ll. Knowles
Attorneys (No Model.) 2 Sheets—Sheet 2.
W. F. COCHRAN.
CULTIVATOR.
No. 507,309. Patented Oct. 24, 1893.
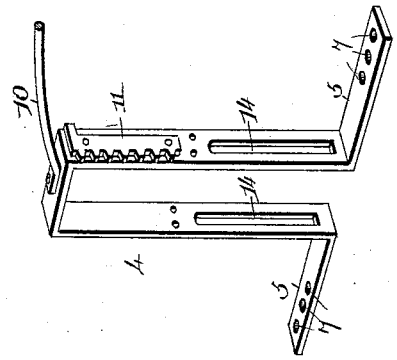
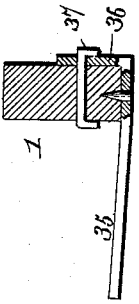
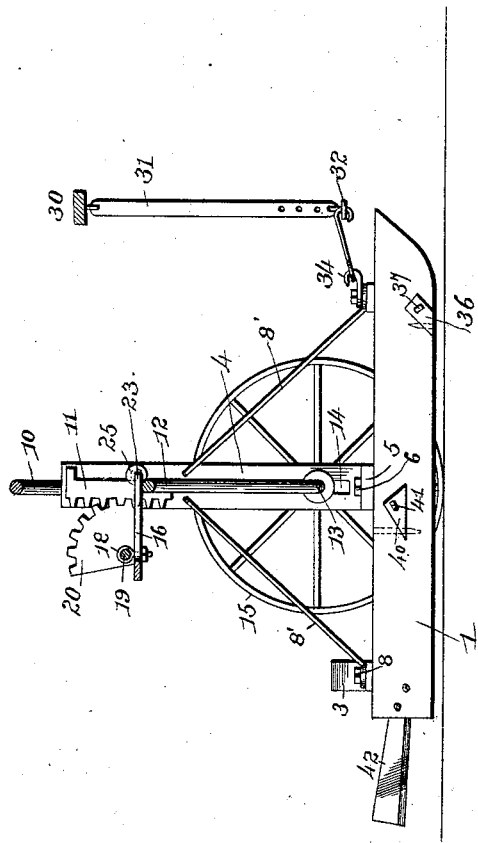
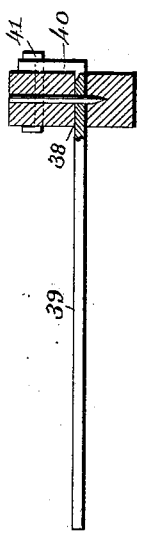
Witnesses
Jas. K. M?Cuthran
W. S. Duvall
Inventor:
William F. Cochran
by C. A. Snow & Co.
Attorneys.

UNITED STATES PATENT OFFICE.

WILLIAM F. COCHRAN, OF OSBORNE, KANSAS.

CULTIVATOR.

SPECIFICATION forming part of Letters Patent No. 507,309, dated October 24, 1893.

Application filed May 8, 1893. Serial No. 473,441. (No model.)

*To all whom it may concern:*

Be it known that I, WILLIAM F. COCHRAN, a citizen of the United States, residing at Osborne, in the county of Osborne and State of Kansas, have invented a new and useful Cultivator, of which the following is a specification.

My invention relates to that class of cultivators adapted for operating upon listed corn; and the objects in view are to provide a cultivator of this class which shall be light of draft, cheap and simple in its construction, and adapted to simultaneously operate upon the centers of two rows, and to effectually scrape the sides and centers of the rows, and eradicate and destroy every vestige of weeds or other foreign growth, and at the same time loosen the soil about the growing corn and cover the roots thereof.

With these general objects in view, and other minor objects not necessary to state, the invention consists in certain features of construction hereinafter specified and particularly pointed out in the claims.

Referring to the drawings:—Figure 1 is a perspective view of a cultivator embodying my invention, said view being taken from a point in rear of the machine. Fig. 2 is a vertical longitudinal sectional view. Fig. 3 is a perspective view in detail of one of the inverted yokes and its adjacent parts. Fig. 4 is a transverse section through one of the runners of one of the sleds and illustrating one manner of fastening a rear cutter in position. Fig. 5 is a similar view illustrating the manner of fastening a front cutter in position.

Like numerals of reference indicate like parts in all the figures of the drawings.

In practice I employ opposite sleds spaced a distance apart to permit of the passage of the machine over a row of young corn, and each sled consists of a pair of opposite parallel runners 1, whose front ends are curved or cut-under, as shown, to facilitate its movement over the corn. The runners near their front ends are connected by transverse cross-pieces 2, and near their rear ends by arched cross-pieces 3. Supported upon each sled is an inverted U-shaped yoke or standard 4, the said yokes or standards of the sleds having the lower portions of their terminals laterally bent forming branches 5 which are bolted by bolts 6 to the upper edges of the runners 1. Each of the terminals 5 has a series of bolt-holes 7, and into any one of these the bolts 6 may be inserted, thus narrowing or widening the distance between the runners of each sled. In order to permit of this adjustability of the runners the bars 2 and 3 are provided with similar openings and bolts 8 serve to adjustably connect said bars and runners. Braces 8' lead from the opposite terminals of the inverted U-shaped yokes 4 to the bolts 8, so that each yoke is braced at four distinct points, as will be obvious. A curved connecting-bar or arch 10 serves to connect the yokes 4 of the two sled-frames together; and below said connecting-bar or arch there is formed upon or secured to the inner sides of the two yokes 4 vertical rack-bars 11.

An arched axle 12 fits loosely between the yokes 4 and its lower ends are bent to form crank-bearings 13, the said crank-bearings each extending through the vertical slots 14 with which the opposite terminals of each yoke 4 are provided, and upon said crank-portions and within each yoke 4 there is mounted on the axle flanged ground-wheels 15, which are therefore located at about the centers of the sled-frames. A bracket 16 extends rearward from the center of the arched axle between the yokes 4, and said bracket has located at one side a toothed locking-standard 17, and opposite the same at the other side a bearing-eye 18. A rock-shaft 19 passes through the standard 17 and the eye 18, and at its ends has secured rigidly thereon toothed segments 20, which engage with the vertical rack-bars heretofore described. An operating lever 21 is also mounted upon the rock-shaft 19 between the segment at one side and the locking-standard and moves with the former and the shaft. There is mounted upon this lever a spring-actuated locking-pawl 22 of ordinary construction, and the same is designed to engage with the teeth of the locking-standard, whereby said lever may be locked at any point of its sweep. It will be seen that by disengaging the pawl and swinging the lever to the rear, the segments operating in the rack-bars will cause the axle to lower until it comes in contact with the ground when the tendency will be to elevate the two sleds and the parts carried thereby above the ground. The machine may now be transported over the ground to and from the field of operation without operating. A reverse or forward movement of the lever will cause the sleds to be lowered until in contact with the ground, after which the axle may be raised until the ground-wheels are out of contact with the ground, and the machine is then ready to operate upon the rows of corn. In this vertical reciprocation of the machine the axle and the parts carried thereby are maintained in sliding connection with the yokes by means of the segments upon the rear side and through the medium of L-shaped keepers 23 upon the front side of the rack-bars, the said keepers 23 extending from the bracket 16 forwardly at each side thereof and engaging the front edges of the rack-bars. For the purpose of facilitating the sliding movement the keepers carry grooved anti-friction rollers 25, which move vertically against the front edges of the rack-bars, the latter serving as tracks in a manner that will be obvious.

A draft-tongue 26 is arranged over the center of the axle, extends rearward, and has let into its under side the bracket 16, the rock-shaft it being understood, necessarily passing through the draft-tongue. A seat for the accommodation of the driver, and designated as 27, is supported upon a curved spring-standard 28 that rises from the rear end of the tongue above the axle, and a driver when seated thereon may readily reach the lever 21 at his side and thus raise and lower the parts in the manner heretofore described for the purpose of throwing the machine into and out of operative position.

Any suitable draft appliance may be employed, and in this instance I have shown as pivoted upon the draft-tongue, as at 29, a double-tree 30, from whose ends there loosely depend draft-bars 31, each having a series of openings, into any one of which the single-trees may be secured. To the lower ends of the draft-bars perforated links 32 are loosely connected, and these through the medium of hook-rods 33, which engage with eyes 34 located upon the outer front bolts 8, are connected to the front corners of the two sled-frames.

35 designates the front inclined scrapers or knives and the same are located upon the under sides of the runners 1, being let therein as shown. The blades themselves at the inner sides of the runners incline upwardly at a slight angle, and have their outer or shank-ends bent as at 36 to embrace the outer sides of the runners. Clips 37 are passed through the runners and the perforated shanks and have their extremities clinched or upset at the inner and outer sides of the runners. In rear of these runners about midway the outer runners and near the rear ends of the inner runners slots 38 are formed, and through these take the main knives 39 which ared is-posed at angles to each other and out of contact, though they are in alignment, that is the rear end of the rear knife overlaps that of the front knife. These knives have their outer ends or shanks upturned or bent at an angle, as at 40, and are likewise secured by clips 41. The rear knives or scrapers 42 are curved, those of each sled being curved in reverse directions and in such manner as to throw the soil toward the outer sides and center of the machine, that is to say, the central scrapers will throw the soil toward the center of the machine or between the sleds, and hence around the young corn over which the machine passes, whereas the outer scrapers will throw the soil toward the rows of corn by which the machine passes. The shanks of these scrapers or blades are bolted in any ordinary manner to the runners, as in fact may also the shanks of all of the scrapers or knives.

I do not limit my invention to the precise details of construction herein shown and described, but hold that I may vary the same to any degree and extent within the knowledge of the skilled mechanic, without departing from the spirit of the invention or sacrificing any of the advantages thereof.

From the foregoing description in connection with the accompanying drawings it will be seen that I have provided a cultivator of cheap and simple construction especially adapted to operate upon listed corn and simultaneously upon two centers; that the corn will be thoroughly cultivated by the passage of the machine thereover; and that all weeds and foreign growth calculated to choke and impede its progress will be effectually destroyed.

Having described my invention, what I claim is—

1. In a cultivator, the combination with the opposite sled-frames, and the inverted U-shaped yokes having vertical slots, of the connection between the yokes, the cranked axle located between the yokes and having its cranked ends passing through the slots, the ground-wheels on the axle within the yokes, a lever, and devices operated by the lever for raising and lowering the axle within the slots of the yokes, substantially as specified.

2. In a cultivator, the combination with the opposite sleds, the inverted U-shaped yokes connected at their upper ends, provided with slots, and having their lower ends laterally bent and provided with a series of perforations, front and rear cross-bars mounted upon the sleds and having similar series of perforations, adjustable bolts for these perforations, of a cranked axle located between the yokes and having its ends passing through the slots thereof and carrying ground-wheels, and means for raising and lowering the axle, substantially as specified.

3. In a cultivator, the combination with the opposite sleds, the front and rear cross-bars and the bolts passed through the cross-bars into the runners of the sleds, of the inverted U-shaped arches connected at their upper ends, the inclined braces leading from the arches to the bolts at the corners of the sleds, slots in the arches, a cranked axle having its ends passed through the slots and provided with ground-wheels, and means for raising and lowering the axle, substantially as specified.

4. In a cultivator, the combination with the opposite sleds, and the inverted U-shaped slotted and connected yokes, of the cranked axle located between the yokes and having its cranks passed through the slots and carrying ground-wheels, the rack-bars at the inner sides of the yokes, a rock-shaft supported in rear of the axle, a lever for operating the rock-shaft, and toothed segments carried by the rock-shaft and engaging with the teeth of the rack-bars, substantially as specified.

5. In a cultivator, the combination with the opposite sleds, the inverted slotted yokes and their connection, each of said yokes being provided at its inner side with a vertical rack-bar, of a cranked axle located between the yokes and having its terminals adapted for vertical movements in the slots and carrying ground-wheels, a bracket extending rearward from the axle and having bearings one of which is a locking-standard, a rock-shaft mounted in these bearings, toothed segments carried by the rock-shaft and engaging the rack-bars, a rock-shaft operating lever having a locking-pawl for engaging the locking-standard, and L-shaped keepers extending forward from the brackets and carrying loose rollers engaging the front edges of the rack-bars, substantially as specified.

6. In a cultivator, the combination with the opposite knife-carrying sleds, of the draft-tongue supported above and between the same, a double-tree pivoted upon the tongue, perforated draft-bars depending from the ends of the double-tree and adapted to receive single-trees, links connected to the lower ends of the draft-bar and having perforations, eyes at the front corners of the sleds, hook-rods connecting the eyes with the perforations in the links, the opposite inverted U-shaped slotted standards connected to the runners, braces leading from the runners to the standards, crank axles located in the slots, ground wheels mounted on the axles within the standards, and means for raising and lowering the said runners, substantially as specified.

7. In a cultivator, the combination with the opposite sleds, each comprising a pair of runners, and means for connecting the same in proper relation, of a pair of short inclined knives extending from the lower edges of the runners, and an intermediate pair of converging overlapping knives arranged above the plane of the inclined knives, and the rear opposite curved scraping-blades, substantially as specified.

In testimony that I claim the foregoing as my own I have hereto affixed my signature in the presence of two witnesses.

WILLIAM F. COCHRAN.

Witnesses:
 JNO. A. BORING,
 E. LIPTON.